(12) United States Patent
Gawarzynska et al.

(10) Patent No.: US 12,471,201 B2
(45) Date of Patent: Nov. 11, 2025

(54) ILLUMINATING MOBILE ENTITIES WITH MARKING DEVICES

(71) Applicant: MOTOROLA SOLUTIONS, INC., Chicago, IL (US)

(72) Inventors: Dorota Gawarzynska, Cracow (PL); Przemyslaw Pikulski, Cracow (PL); Artur Kaczanowski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 438 days.

(21) Appl. No.: 18/092,010

(22) Filed: Dec. 30, 2022

(65) Prior Publication Data

US 2024/0224403 A1 Jul. 4, 2024

(51) Int. Cl.
*H04W 4/021* (2018.01)
*H05B 47/19* (2020.01)
*H04W 4/90* (2018.01)

(52) U.S. Cl.
CPC ............ *H05B 47/19* (2020.01); *H04W 4/021* (2013.01); *H04W 4/90* (2018.02)

(58) Field of Classification Search
CPC ....... H04W 4/90; H04W 4/021; H04W 4/022; H05B 47/19; H05B 47/195; H05B 47/196; H05B 47/471965; H05B 47/197; H05B 47/1985; H05B 47/199
USPC ...................................................... 455/456.1
See application file for complete search history.

(56) References Cited

U.S. PATENT DOCUMENTS

| | | | |
|---|---|---|---|
| 7,878,678 B1 | 2/2011 | Stamatatos et al. | |
| 9,406,010 B2 | 8/2016 | Rujan | |
| 9,577,755 B2 | 2/2017 | Jovicic et al. | |
| 10,027,412 B2 | 7/2018 | Eroglu et al. | |
| 10,395,544 B1* | 8/2019 | Harris | G06Q 10/083 |
| 10,482,361 B2 | 11/2019 | Yanson et al. | |
| 2005/0152142 A1 | 7/2005 | Traynor | |
| 2011/0082881 A1* | 4/2011 | Chunilal | H04L 12/18 707/E17.107 |
| 2013/0247117 A1* | 9/2013 | Yamada | H04B 5/72 340/12.5 |
| 2014/0233842 A1* | 8/2014 | Gardner | G06K 7/1439 382/143 |

(Continued)

FOREIGN PATENT DOCUMENTS

KR 101652300 B1 9/2016

OTHER PUBLICATIONS

La Delfa, Gaetano C., et al. "Performance analysis of visualmarkers for indoor navigation systems." Frontiers of Information Technology & Electronic Engineering 17.8 (2016): 730-740.

(Continued)

*Primary Examiner* — Jean A Gelin
(74) *Attorney, Agent, or Firm* — PERRY + CURRIER INC (57) ABSTRACT

An analysis is performed on a request to compare a resource determined from the request with resources provided or needed by mobile physical entities, such as people, vehicles, or equipment. The analysis includes matching the request to a mobile physical entity. A target marking device that is associated with the mobile physical entity that matches the request is selected. A marking signal is transmitted to the target marking device to cause the target marking device to illuminate and thereby visually mark the mobile physical entity that matches the request.

18 Claims, 7 Drawing Sheets

(56) References Cited

U.S. PATENT DOCUMENTS

2017/0063457 A1* 3/2017 Yamasaki .......... G01C 21/3661

OTHER PUBLICATIONS

Wikipedia, "Triage Tag." Wikipedia, Wikimedia Foundation, Jun. 17, 2022, Retrieved from the Internet on Dec. 30, 2022 at URL: https://en.wikipedia.org/wiki/Triage_tag.

* cited by examiner

ILLUMINATING MOBILE ENTITIES WITH MARKING DEVICES

BACKGROUND

Emergency incidents and similar situations often have a number of people, such as first responders, attend a scene to take action. It is often the case that people work together to deal with the incident. Effective communication is important for cooperation. An incident may be confusing, and it may take time and effort to achieve effective communication, more so when the incident presents confounding factors, such as smoke, fog, darkness, noise, and so on.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

People and vehicles attending incidents often carry communications devices, such as mobile phones, radios, walkie-talkies, and similar devices. While these devices may provide for certain modes of effective communication, it may be difficult or cumbersome to identify a person's location using these devices. Verbal descriptions of location may be inaccurate and take time and effort to produce. And while many mobile phones have tools, such as mapping applications, to assist in locating people, such applications tend to lack accuracy and may be cumbersome or inconvenient to use, particularly during a fast-paced response to an emergency.

The techniques disclosed herein include marking devices to visually mark people, vehicles, and mobile equipment that may be present at an incident. A request may be made to a system, such as by voice or text, and the system may illuminate the marking device of a person, vehicle, or piece of equipment that matches the request. Accordingly, the requester may be quickly visually informed of the precise location of the person, vehicle, or equipment that satisfies the request.

In accordance with an example embodiment, a system includes a server that includes a server communications interface configured to receive a request and transmit a marking signal via a network, and a processor connected to the server communications interface. The processor is configured to perform an analysis on the request to match the request to a mobile physical entity of a plurality of mobile physical entities, select from a plurality of marking devices that are deployable to the plurality of mobile physical entities a target marking device that is associated with the mobile physical entity that matches the request, and transmit the marking signal to the target marking device via the server communications interface to cause a light source of the target marking device to illuminate and thereby mark the mobile physical entity that matches the request.

In accordance with another example embodiment, a non-transitory computer-readable medium includes instructions that, when executed by a processor, cause the processor to perform an analysis on a request to match the request to a mobile physical entity of a plurality of mobile physical entities deployed with a plurality of marking devices. The analysis compares a resource determined from the request with resources provided or needed by the plurality of mobile physical entities to determine the match. Each marking device of the plurality of marking devices is configured to selectively illuminate. The analysis includes matching the request to the mobile physical entity based on the plurality of mobile physical entities providing or needing the resource. The instructions are further to select from the plurality of marking devices a target marking device that is associated with the mobile physical entity that matches the request, and control a communications interface to transmit a marking signal to the target marking device to cause the target marking device to illuminate and thereby mark the mobile physical entity that matches the request.

In accordance with another example embodiment, a method includes performing an analysis on a request to match the request to a mobile physical entity of a plurality of mobile physical entities deployed with a plurality of marking devices. The analysis compares a resource determined from the request with resources provided or needed by the plurality of mobile physical entities to determine the match. Each marking device of the plurality of marking devices is configured to selectively illuminate. The analysis includes matching the request to the mobile physical entity based on the plurality of mobile physical entities providing or needing the resource. The method further includes selecting from the plurality of marking devices a target marking device that is associated with the mobile physical entity that matches the request, and transmitting a marking signal to the target marking device to cause the target marking device to illuminate and thereby mark the mobile physical entity that matches the request.

The above-mentioned embodiments will be discussed in more detail below, starting with example system and device architectures of the system in which the embodiments may be practiced, followed by an illustration of processing blocks for achieving an improved technical method, device, and system for illuminating mobile entities with marking devices.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
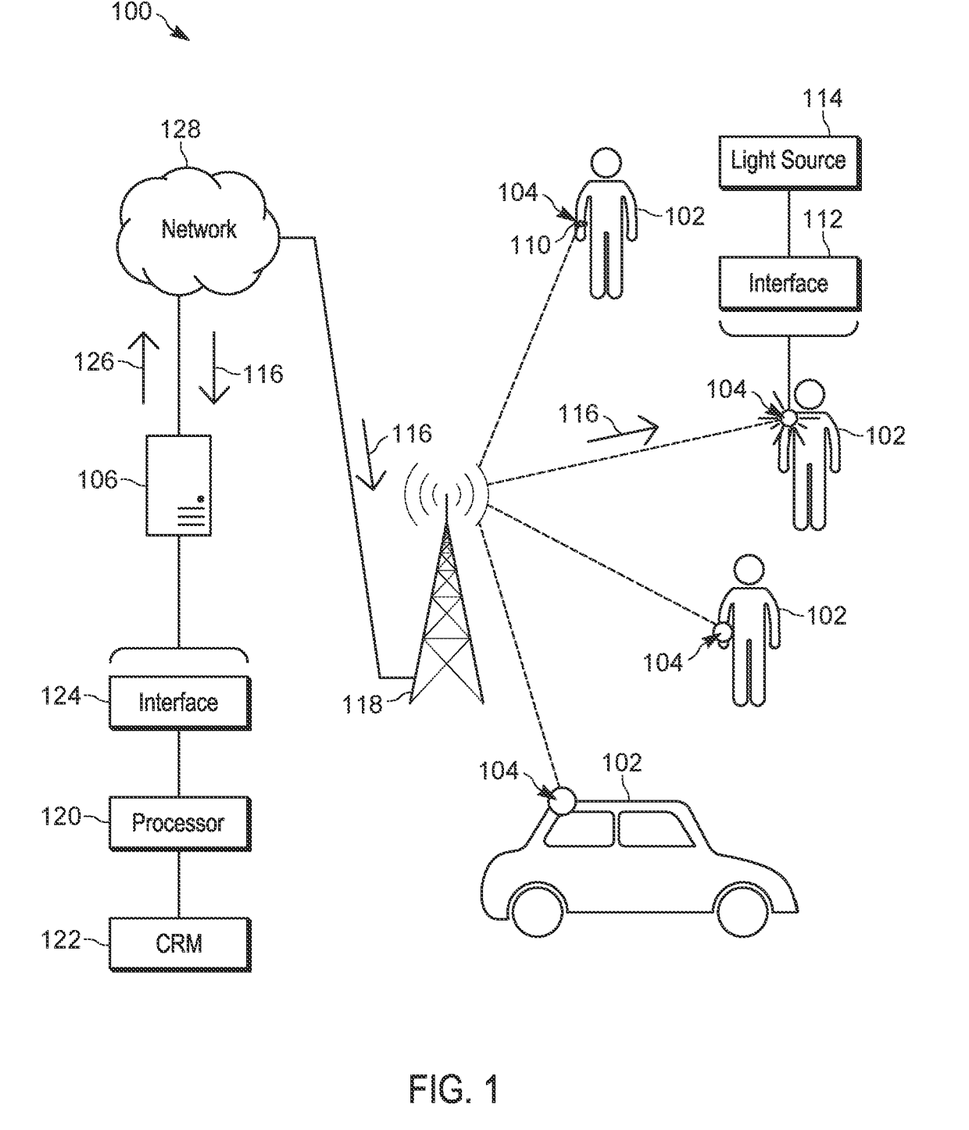
FIG. 1 is a schematic diagram of an example system for selectively marking mobile physical entities, such as people, vehicles, or equipment, based on resources provided by or needed by such entities.

FIG. 1 shows an example system 100 for selectively marking mobile physical entities 102, such as people or vehicles, based on resources provided by or needed by such entities 102. The system 100 analyzes a request, which may originate from one of the mobile physical entities 102, determines which of the mobile physical entities 102 matches the request, and illuminates a marking device 104 carried by the matching entity 102, so that others may be quickly visually alerted to the entity's precise location.

Examples of mobile physical entities 102 include people, vehicles, and equipment. In examples that concern first responders, mobile physical entities 102 may include paramedics, police officers, firefighters, security personnel, ambulances, firefighting vehicles, police vehicles, mobile generators, mobile communications equipment, trailered equipment, so on. During emergency incidents, in which mobile physical entities 102 are expected to move around to render aid and serve their roles, the system 100 may be useful to selectively visually mark such entities 102 to make them readily visible during what may be a fast-paced and potentially confusing situation. Moreover, emergency incidents may suffer from low visibility caused by darkness, fog, smoke, and similar factors, in which case illuminated visual marking may be particularly useful. In this description, mobile physical entities may be singularly or collectively referred to by a reference numeral, such as 102, whereas a particular mobile physical entity being referenced as an example may be referred to with letter appended to such a numeral, such as 102A, 102B, 102C, etc.

The system 100 includes a plurality of marking devices 104 deployable to the plurality of mobile physical entities 102 and further includes a server 106. For example, a marking device 104 may be assigned to workers and vehicles belonging to an emergency response organization or agency. Assignments may be maintained in a database that correlates people, vehicles, and equipment to specific marking devices 104. An example database may correlate user, vehicle, and equipment IDs to marking device IDs.

A marking device 104 may be temporarily activated to illuminate and thereby visually mark an associated mobile physical entity 102. The marking device 104 may include an attachment component 110 configured to attach the marking device 104 to a person, person's clothing, or vehicle. The attachment component 110 may include a wristband, a hook-and-loop fastener (e.g., Velcro), a clip, a snap, magnet, or similar. In other examples, the marking device may be part of a mobile communications device (e.g., phone, radio, etc.), a body-worn camera (bodycam), or other device carried by or worn by a person or attached to a vehicle.

In this description, a marking device may be singularly or collectively referred to by a numeral, such as 104, whereas a particular marking device may be referred to with an additional letter, such as 104A, 104B, 104C, etc.

Each marking device 104 includes a marker communications interface 112 and a light source 114. (The qualifier "marker" is used here merely to distinguish the interface 112 from a similar interface 124 at the server 106.)

The marker communications interface 112 is configured to receive a marking signal 116 via a wireless network 118, such as a cellular or mobile network. The wireless network 118 may include a fixed (e.g., tower-mounted) or portable radio antenna to wirelessly communicate with the marking devices 104. The network 118 should be wireless at least in the vicinity of the mobile physical entities 102 to facilitate their mobility and may include wired components elsewhere.

The marker communications interface 112 may include a wireless interface, such as an antenna and supporting circuitry, a wired interface, or both. A wireless interface may allow the marking device 104 to directly communicate with the wireless network 118. With a wired interface, the marking device 104 may be plugged into a wireless communications device, such as a radio or mobile phone, carried by the mobile physical entity 102. That is, the marking device 104 may be an accessory to such a wireless communications device, which may provide signal and/or power to the marking device 104.

The marker communications interface 112 may be associated with an addressable ID, so that a marking signal 116 may be addressed to the marking device 104. Such an ID should be unique to a set of marking devices 104 served by the server 106.

The light source 114 is connected to the marker communications interface 112 and is configured to illuminate in response to the marker communications interface 112 receiving the marking signal 116. The light source 114 may be configured to respond to marking signals 116 encoding different commands, such as a command to illuminate the light source at an encoded color that accompanies the command. For example, the light source 114 may be commanded to illuminate continuously, flash, illuminate at a selected color, modulate its brightness, modulate at selected colors, cycle among different patterns of color or brightness, and so on. Examples of light sources 114 include light-emitting diodes (LEDs), multicolor LEDs, halogen bulbs, and similar devices.

A marking device 104 may include a processor connected between the marker communications interface 112 and the light source 114 to decode the marking signal and drive the light source accordingly. However, a separate processor may be omitted if the marker communications interface 112 includes sufficient processing functionality to decode and share signals with the light source 114.

A marking device 104 further includes a power source to power its components. Examples of suitable power devices include batteries (rechargeable or disposable) and solar panels.

The server 106 is a computing device that includes a processor 120 and non-transitory computer-readable medium 122, such as a volatile memory, non-volatile memory, or combination of such.

The server 106 further includes a server communications interface 124 connected to the processor 120 and configured to receive a request 126 and transmit a marking signal 116 to any of the marking devices 104.

The server communications interface 124 enables the server 106 to communicate with a network 128 to which the wireless network 118 and marking devices 104 are connected. The network 128 may include wired and wireless components. The network 128 may include the internet, a wire-area network (WAN), a local-area network (LAN), a virtual private network (VPN), and similar. In various examples, the network 128 and wireless network 118 are provided by the same device, such as a portable local-area wireless network device that may be brought to an incident to facilitate communications among first responders.

The processor 120 may cooperate with the medium 122 by, for example, executing instructions stored at the medium 122, to generate and transmit a marking signal 116 to any of the marking devices 104 determined to meet the requirement of the request 126.

A request 126 may include an expressed need for a resource or an expressed capability to provide a resource among the mobile physical entities 102. The request 126 may specify the resource and may further specify whether the resource is needed or is able to be provided. When the system 100 is implemented for first responders, examples of resources include a role of a first responder, a skill of a first responder, a piece of equipment carried by a first responder, a first-aid supply carried by a first responder, a vehicle operated by a first responder, incident information associated with a first responder, a piece of equipment carried by a vehicle, a first-aid supply carried by a vehicle, and incident information associated with a vehicle. A resource may be tangible, such as a person, vehicle, or piece of equipment, or intangible, such as a role or skill that a first responder may be trained in.

An example request 126 may specify a need for a paramedic, a need for a commander (i.e., the role "commander"), a need for pain medication, a capability to provide bandages, a need for an ambulance, a capability to provide a defibrillator, and so on. Need and capability to provide may be unnecessary or may be implicit with the resource. For example, a request 126 that specifies a need for a commander may simply specify the resource of commander with the need being implied. These are merely several illustrative examples.

The request 126 may originate from voice or text data captured from a person, such as a mobile physical entity 102. Voice may undergo speech recognition, natural language processing (NLP), or a combination of such to determine the resource and whether it is needed or provided. Voice may be spoken into a mobile communications device carried by the requester. Text may be provided as a text message, chat message, or similar message typed into an application at a mobile communications device carried by the requester.

The request 126 may be communicated to the server 106 via the network 128.

The processor 120 of the server 106 is configured to perform an analysis on the request 126 to match the request 126 to a mobile physical entity 102. The analysis identifies a requirement in the request 126 and determines which of the mobile physical entities 102 meets the requirement. For example, a request 126 may indicate the need for a first aid kit, and the analysis may identify a paramedic carrying a first aid kit as a suitable mobile physical entity 102.

If multiple mobile physical entities 102 match a request, the processor 120 may select a single best match based on one or more various factors, such as proximity to the requester. Alternatively, the processor 120 may mark multiple mobile physical entities 102 that match a request 126.

The processor 120 is configured to select from the plurality of marking devices 104 that it is able to command a target marking device 104 that is associated with the mobile physical entity 102 that matches the request 126. The achieve this, the server 106 may maintain an association of marking devices 104 to physical entities 102, in that a physical entity 102 may be assigned a marking device 104 and knowledge of this assignment is available to the processor 120. The processor 120 may reference the database or other data store that maintains such an association.

The processor 120 is configured to transmit a marking signal 116 to the target marking device 104 via the server communications interface 124. The marking signal 116 causes the light source 114 to illuminate and thereby visually mark the mobile physical entity 102 that matches the request 126. The source of the request 126, which may be another mobile physical entity 102 at the same general location, other mobile physical entities 102, or anyone with a line of sight to the target marking device 104 may thus be visually informed of the location of the mobile physical entity 102 that requires or is able to provide the resource that is the subject of the request 126.

The processor 120 may also be configured to transmit a marking signal 116 to a source marking device 104 that was the source of the request 126. The marking signal 116 causes the light source 114 of the source marking device 104 to illuminate and thereby visually mark the mobile physical entity 102 that originated the request 126. This may be useful when the source of the request also carries a marking device 104, the source of the request 126 is different from the target of the request 126, and when illuminating the source of the request 126 would assist in request being completed efficiently.

In an illustrative example, firefighters and paramedics may be mobile physical entities 102 responding to a fire. Each person may wear a marking device 104. A firefighter may rescue a person from the fire and may wish to take this person to the nearest paramedic for medical assistance. The firefighter speaks a request 126 into their radio or mobile phone, such as "Paramedic needed." The server 106 receives this request, analyzes it, and transmits a marking signal 116 to the marking device 104 worn by the paramedic nearest the firefighter. In response to the marking signal 116, the paramedic's marking device 104 illuminates red. The firefighter sees the marking device 104 illuminate, and their radio or mobile phone may also emit an audible advisory message received from the server, such as "Paramedic marked with red." The firefighter may then efficiently take the rescued person to the paramedic despite low visibility that may be caused by smoke or steam from the fire.

Figure 2:
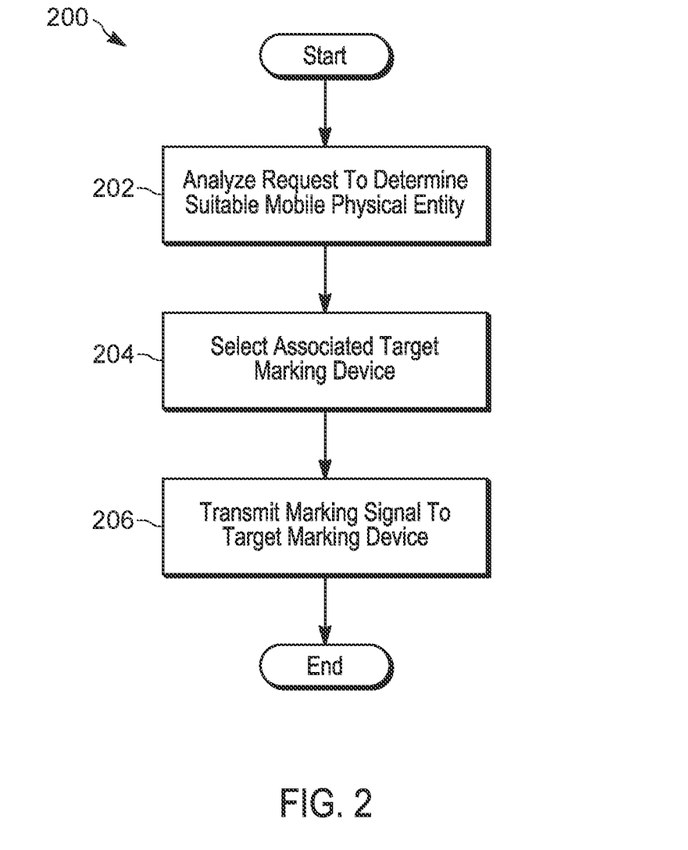
FIG. 2 is a flowchart of an example method of selectively marking mobile physical entities based on resources provided by or needed by such entities.

FIG. 2 shows an example method 200 of selectively marking mobile physical entities, such as people, vehicles, or equipment, based on resources provided by or needed by such entities. The system 100 or any of the other systems discussed herein may be used to carry out the method 200. The method 200 may be embodied by instructions that are executed by a processor.

At block 202, an analysis is performed on a request to match the request to a mobile physical entity of a plurality of mobile physical entities deployed with a plurality of marking devices. The request may specify a resource that a mobile physical entity is able to provide or needs. The analysis compares the resource determined from the request with resources provided or needed by the larger group of mobile physical entities, so as to determine a match.

A block 204, a target marking device is selected. The selected target marking device is associated with the mobile physical entity that matches the request. A marking device associated with an entity capable of providing a resource may be illuminated, a marking device associated with an entity that needs a resource may be illuminated, or both (or many) such marking devices may be illuminated.

At block 206, a marking signal is transmitted to the target marking device to cause the target marking device to illuminate. Thus, the mobile physical entity that matches the request is illuminated and thereby visually marked, so that another mobile physical entity may readily see it and move to its location to deliver or receive the resource.

Figure 3:
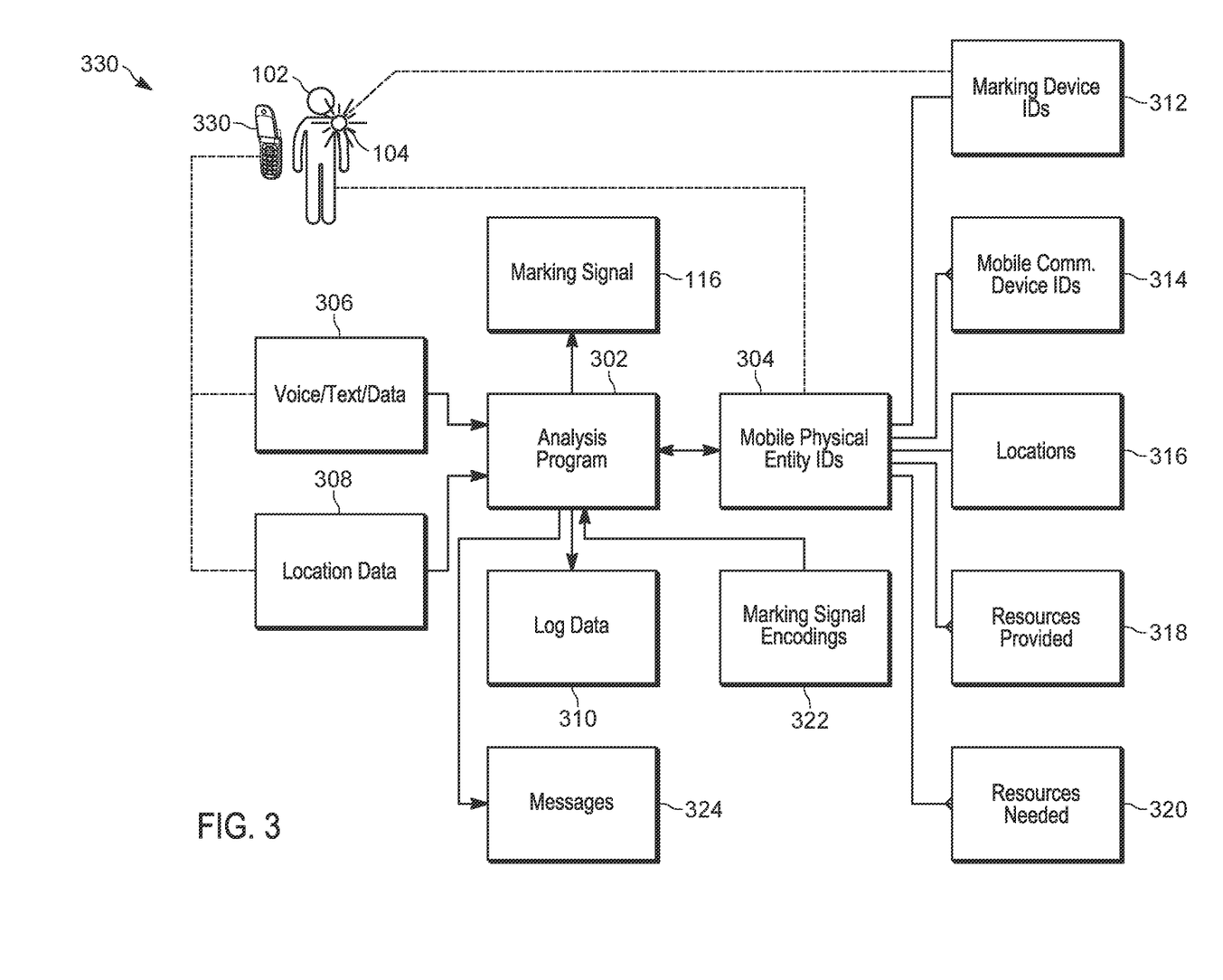
FIG. 3 is a schematic diagram of an example data processing system to selectively mark mobile physical entities based on resources provided by or needed by such entities.

FIG. 3 shows an example data processing system 300 to selectively mark mobile physical entities, such as people, vehicles, or equipment, based on resources provided by or needed by such entities. The data processing system 300 may be used with the system 100 of FIG. 1, the method 200 of FIG. 2, or any of the other systems and methods discussed herein. The data processing system 300 may be embodied by data structures and related instructions that are executed by a processor.

The system 300 includes an analysis program 302 that may be implemented as processor-executable instructions at a computing device, such as the server 106 of FIG. 1.

The analysis program 302 may reference mobile physical entities, such as the entities 102 of FIG. 1, by way of identifiers 304. IDs 304 may be relatively unique, so that each mobile physical entity served by the analysis program 302 may be distinguished.

The analysis program 302 takes as input voice or text data 306 and location data 308. The analysis program 302 outputs marking signals 116 and log data 310. The analysis program 302 may take as input or provide as output various data associated with mobile physical entity IDs 304, such as marking device identifiers 312, mobile communications device identifiers 314, locations 316, resources provided 318, and resources needed 320.

The analysis program 302 may be implemented with structured logic (e.g., if A and B, then do C), a rules engine, machine learning, artificial intelligence, or similar technique. The analysis program 302 may be implemented with a virtual assistant, such as ViQi™ provided by Motorola Solutions, Inc.

Mobile physical entity ID 304 may be associated to marking device ID 312 (one-to-one), mobile communication device ID 314 (one-to-many, as a person may have more than one communications device), location 316 (one-to-one), resources provided 318 (one-to-many), and resources needed 320 (one-to-many).

Voice or text data 306 may include structured data, such as text, received from a speech-to-text engine that processes voice utterances captured by mobile communications devices 330 carried by mobile physical entities 102 or received as text from such mobile communications devices 330. Alternatively, voice or text data 306 may include audio signals that are processed by the analysis program 302. Voice or text data 306 is associated with mobile communication device IDs 314. The mobile physical entity 102 that generated the voice or text data 306 is thereby able to be identified via the correspondence of mobile communication device ID 314 to mobile physical entity ID 304. The analysis program 302 processes the voice or text data 306 to determine resources provided 318 and resources needed 320. A given instance of voice or text data 306 may be considered a request for a resource or a request to provide a resource (see request 126 of FIG. 1).

Location data 308 may include geographic coordinates, location identifiers (e.g., names), room identifiers, or other structured data indicative of physical locations. Location data 308 may be captured by a tracking system that, for example, monitors global-positioning system (GPS) data reported by mobile communications devices 330 carried by mobile physical entities 102.

Log data 310 may include structured data that lists log events correlated to time and mobile physical entity ID 304. Log events may include, in relation to mobile physical entity ID 304, voice or text data 306, location 316, a resource provided 318, a resource needed 320, so that log data 310 captures instances and changes of these elements over time. Log data 310 may constitute a history of an incident.

Marking device IDs 312 may be relatively unique identifiers that allow each marking device 104 of a set served by the analysis program 302 to be distinguished. Marking device IDs 312 allow the analysis program 302 to address a marking signal 116 to a target marking device 104.

Mobile communication device ID 314 is a relatively unique identifier that allows voice or text data 306 and location data 308 to be associated with a mobile communications device 330 carried by a mobile physical entity 102.

Locations 316 may include data representative of current locations associated with the mobile physical entities 102, as may be determined from reported location data 308 received from mobile communications device 330 carried by the mobile physical entities 102. Location 316 may take the same form as location data 308. The analysis program 302 may update location 316 as new location data 308 is reported.

Resources provided 318 may include data representative of resources provided by mobile physical entities 102. Resources provided 318 may expressed as text, resource IDs, or references to a database that stores resource information.

Resources needed 320 may include data representative of resources needed by mobile physical entities 102. Resources needed 320 may expressed as text, resource IDs, or references to a database that stores resource information.

Resources provided and needed 318, 320 may be configured to be consistent with the organizational structure of the mobile physical entities 102. Resources provided and needed 318, 320 may reflect a command or reporting hierarchy. For example, the role of commander may be limited to a unit commander of a particular unit of first responders, and one such commander or a distinct commander may be in charge of a scene. Additionally or alternatively, mobile physical entity IDs 304 may be configured to reflect such organizational structures. It may be the case that multiple independent units of first responders attend an emergency, and so information about such units may be programmed to provide context to requests. For example, a person may request that "my commander" be marked. Resources provided 318 may be configured to store roles as well as services (e.g., "Commander—Firefighting") and mobile physical entity IDs 304 may be associated with services (e.g., "Firefighting," "Police," etc.), so that a request associated with a mobile physical entity ID 304 of a particular service (or team, unit, department, company, etc.) may be matched with the corresponding resource (e.g., the commander of that service). In short, resources provided and needed 318, 320 and mobile physical entity IDs 304 may be configured to represent organizational structures, so that requests may be processed in the context of such organizational structures.

The analysis program 302 is configured to process received voice or text data 306 to determine whether the voice or text data 306 refers to a resource that is needed or provided. The analysis program 302 may update resources provided 318 and resources needed 320 for mobile physical entity IDs 304 associated with mobile communications device IDs 314 that are associated with received voice or text data 306. Accordingly, the analysis program 302 may maintain a current list of resources provided 318 and resources needed 320, if any, by each mobile physical entity 102. The analysis program 302 may also log voice or text data 306 and any resources determined to be provided and needed as log data 310 for future reference.

The analysis program 302 is configured to process received location data 308 to maintain a current location 316 for each mobile physical entity 102. The analysis program 302 may also log location data 308 for future reference.

The analysis program 302 may treat resources provided 318 and resources needed 320 as open requests (see request 126 of FIG. 1). The analysis program 302 is configured to match a resource provided 318 with a resource needed 320 and generate a corresponding marking signal 116. The analysis program 302 may reference location 316 when determining a match, so that a nearby or closest resource provided 318 or resource needed 320 may be selected.

The analysis program 302 may compare locations 316 using route planning with reference to a map of the location of an incident. For example, a building map may be provided to the analysis program 302, so that pathways around and within the building may be referenced when determining proximity between a resource provided 318 and a resource needed 320.

The analysis program 302 may generate a marking signal 116 for one or both (or many) of a marking device 102 associated with a respective mobile physical entity 102 associated with the resource provided 318 or resource needed 320. The analysis program 302 may then initiate transmission of the generated marking signal 116 to the target marking device 104.

The analysis program 302 may be configured to reference a set of marking signal encodings 322 to generate a marking signal 116. Marking signal encodings 322 may designate color and/or modulation for marking signals 116, so that marking signals with different visual characteristics may be used at the same time to distinguish different instances of resources provided or needed. The analysis program 302 may track the marking signal encodings 322 in use to avoid using the same illumination encoding to mean two different things.

The analysis program 302 may be configured to generate messages 324 for one or both (or many) mobile physical entities 102 associated with a matching of resource provided 318 and resource needed 320. The analysis program 302 may initiate transmission of such messages to a respective mobile communications device 330 using the respective device ID 314. A message may acknowledge, advise, or instruct mobile physical entity 102, or provide other information to a mobile physical entity 102. A message may confirm a requested need or ability to provide a resource contained in voice data. The entity 102 speaking the request may thus receive an acknowledgement that the request was received and processed. A message may advise or instruct a mobile physical entity 102 to look for or move towards a specific illuminated marking device 104 in response to matching a needed resource with a provided resource.

Figure 4:
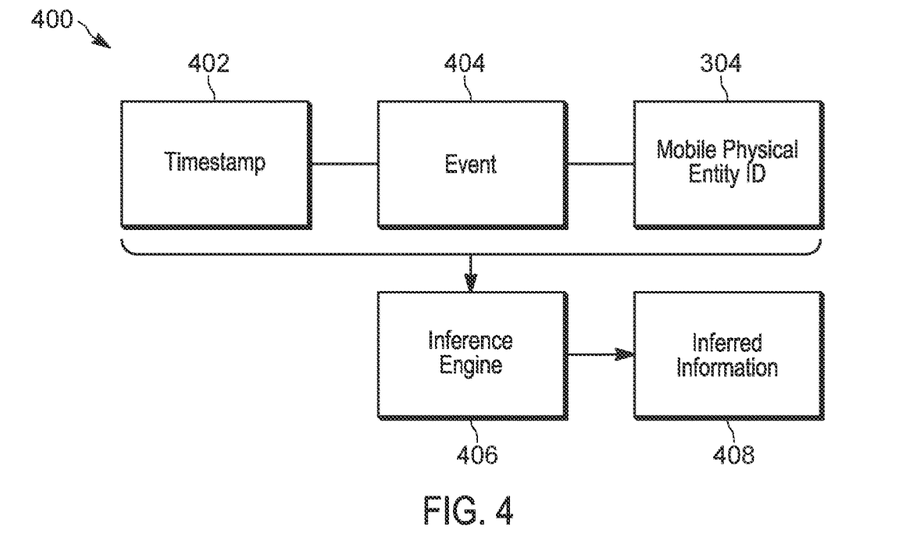
FIG. 4 is a schematic diagram of an example data structure to provide history or other information to allow selective marking of mobile physical entities based on resources provided by or needed by such entities.

FIG. 4 shows an example data structure 400 to provide history or other information to allow selective marking of mobile physical entities, such as people, vehicles, or equipment, based on resources provided by or needed by such entities. The data structure 400 may be used with the system 100 of FIG. 1, the method 200 of FIG. 2, the data processing system 300 of FIG. 3, or any of the other systems and methods discussed herein. The data structure 400 may be used for the log data 310 of FIG. 3.

The data structure 400 includes elements to store a timestamp 402, event 404, and mobile physical entity ID 304. The timestamp 402 specifies the time of an event 404 and the mobile physical entity ID 304 specifies the mobile physical entity related to the event 404.

An event 404 may be represented by structured data, such as a text string that uses keywords. Keywords, such as PROVIDE, NEED, and names of resources, such as FIRST AID KIT, COMMANDER, PARAMEDIC, etc., may be predetermined to define resources provided 318 and resources needed 320 (see FIG. 3). Locations may be expressed in events 404 as location names or coordinates. Text strings are merely an illustrative example, and events 404 may be stored using other types or formats of data. An event 404 may capture other types of information, such as communications between mobile physical entities (radio chatter).

An event 404 may thus express a need for a resource by a mobile physical entity ID 304, a mobile physical entity ID 304 having the ability to provide a resource, a location of a mobile physical entity ID 304, and so on.

The data structure 400 may be considered a history of an incident. The analysis program 302 (FIG. 3) may log events to the data structure 400 and further may reference the contents of the data structure 400 when matching resource needs with resources provided. The analysis program 302, for example, may be configured to search the data structure 400 for unfilled needs and corresponding available resources, as well as location and time, which may be used to provide suitable matches or best matches. The data structure 400 may supplement or replace the location 316, resources provided 318, and resources needed 320 elements of FIG. 3.

An inference engine 406 may be provided to infer information concerning an incident represented by the data structure 400. The inference engine 406 may be implemented with structured logic (e.g., if A and B, then do C), a rules engine, machine learning, artificial intelligence, or similar technique. The inference engine 406 may be implemented by instructions that are executed by a processor. The inference engine 406 may be implemented with a virtual assistant, such as ViQi™ provided by Motorola Solutions, Inc.

The inference engine 406 may be configured to correlate events 404 and mobile physical entity IDs 304. For example, if several events 404 with the same specified location refer to the same mobile physical entity ID 304, then the inference engine 406 may determine that the mobile physical entity with that ID 304 possesses knowledge about the nature of the incident at that location. In another example, if several events 404 are close in time, as indicated by timestamps 402, and refer to the same needed resource, then the inference engine 406 may determine that this resource has a strong need at this time. In still another example, a mobile physical entity with that ID 304 that appears at a high frequency in the data structure 400 may be deemed to represent an entity that has knowledge about the incident as a whole. Numerous other examples are also contemplated.

The inference engine 406 may thus generate and output inferred information 408, which may be provided to the analysis engine 302 (FIG. 3) to aid in matching resource need with resource provision. Additionally or alternatively, inferred information 408 may itself be treated as a resource that is able to be provided. For example, the inference engine 406 may attribute information about an incident (e.g., situational awareness) to a mobile physical entity ID 304 by correlations in location, resources provided or needed, ID frequency, or other information captured with an event 404. The analysis program 302 may be configured to respond to a request for information about the incident by illuminating the marking device associated with such a mobile physical entity ID 304.

Figure 5A:
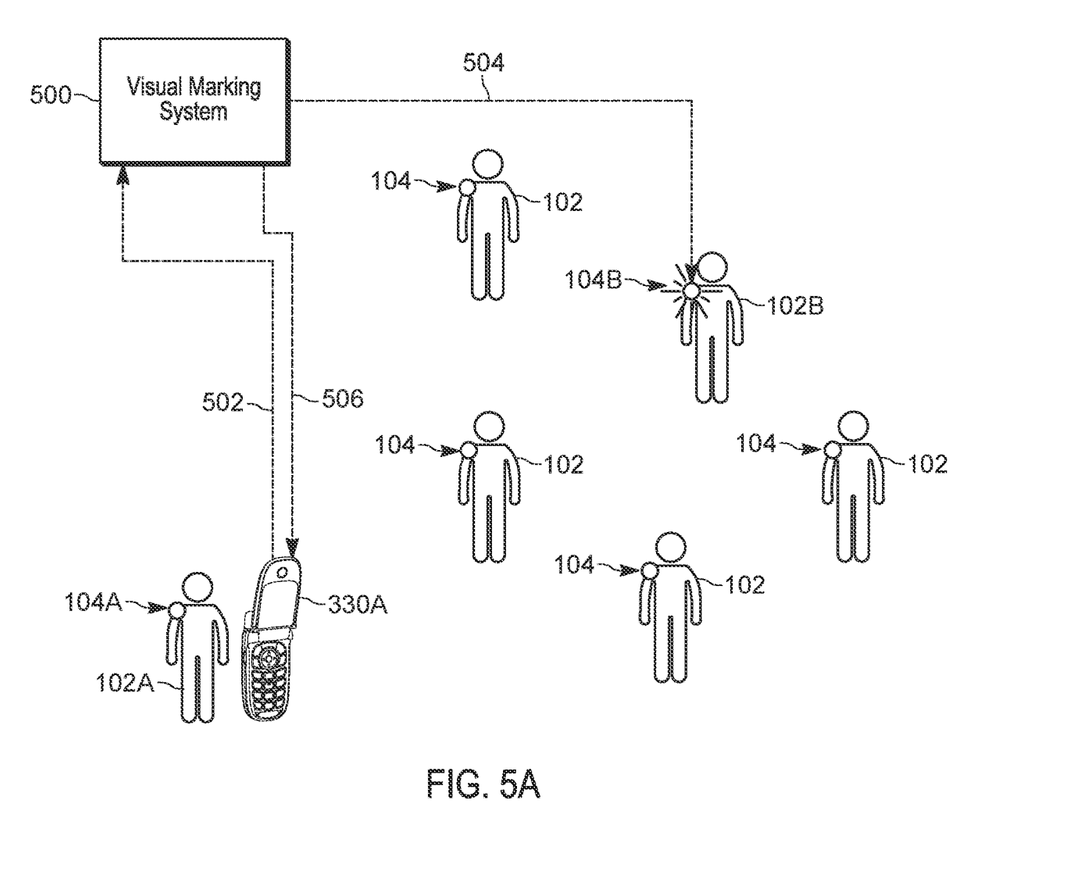
FIG. 5A is a schematic diagram of an example incident in which a first mobile physical entity requests a resource, and a second mobile physical entity is marked accordingly.

FIG. 5A shows an example incident managed by a visual marking system 500. The marking system 500 may implement any of the systems and methods discussed above.

A first mobile physical entity 102A, such as a first responder, arrives at an incident. The first responder 102A makes a request 502 for a resource from the system 500. In this example, the first responder 102A does not know from whom to seek for instructions, so the resource is the role of incident commander. In other examples, the resource may be a first aid supply, medical supply, skill, or other equipment or characteristic of another first responder 102.

The request 502 may be a verbal request spoken to the mobile communications device 330A carried by the first responder 102A, such as "Where is the commander?" The mobile communications device 330A communicates the request 502 to the marking system 500, which analyzes the request 502 (detecting the word "commander") and identifies a first responder 102B from among other first responders 102 as capable of providing the resource requested. The ID of the first responder 102B may be associated with the role "commander" in the database queried by the system 500. The processing of the request 502 may reference context information, such a command structure. As such, a request indicating "commander" or "my commander" may be processed to identify the relevant commander or the most relevant commander if more than one commander applies.

The marking system 500 then queries its database to determine the ID of the marking device 104B carried by the target first responder 102B and transmits a marking signal 504 to the marking device 104B. The marking device 104B then illuminates according to the marking signal (with any color or modulation encoded therein) so that the target first responder 102B becomes visibly highlighted to the first responder 102A that was the source of the request.

The marking system 500 may further transmit an advisory message 506 to the mobile communications device 330A of the requesting first responder 102A to indicate that the request was received and executed. The advisory message 506 may be outputted by the device 330A as audio or text. An example advisory message is "The incident commander is now shown with a red light."

The requesting first responder 102A may then readily identify the commander 102B among other first responders 102, bystanders, or people affected by the incident within darkness, smoke, fog, or other cause of reduced visibility.

Figure 5B:
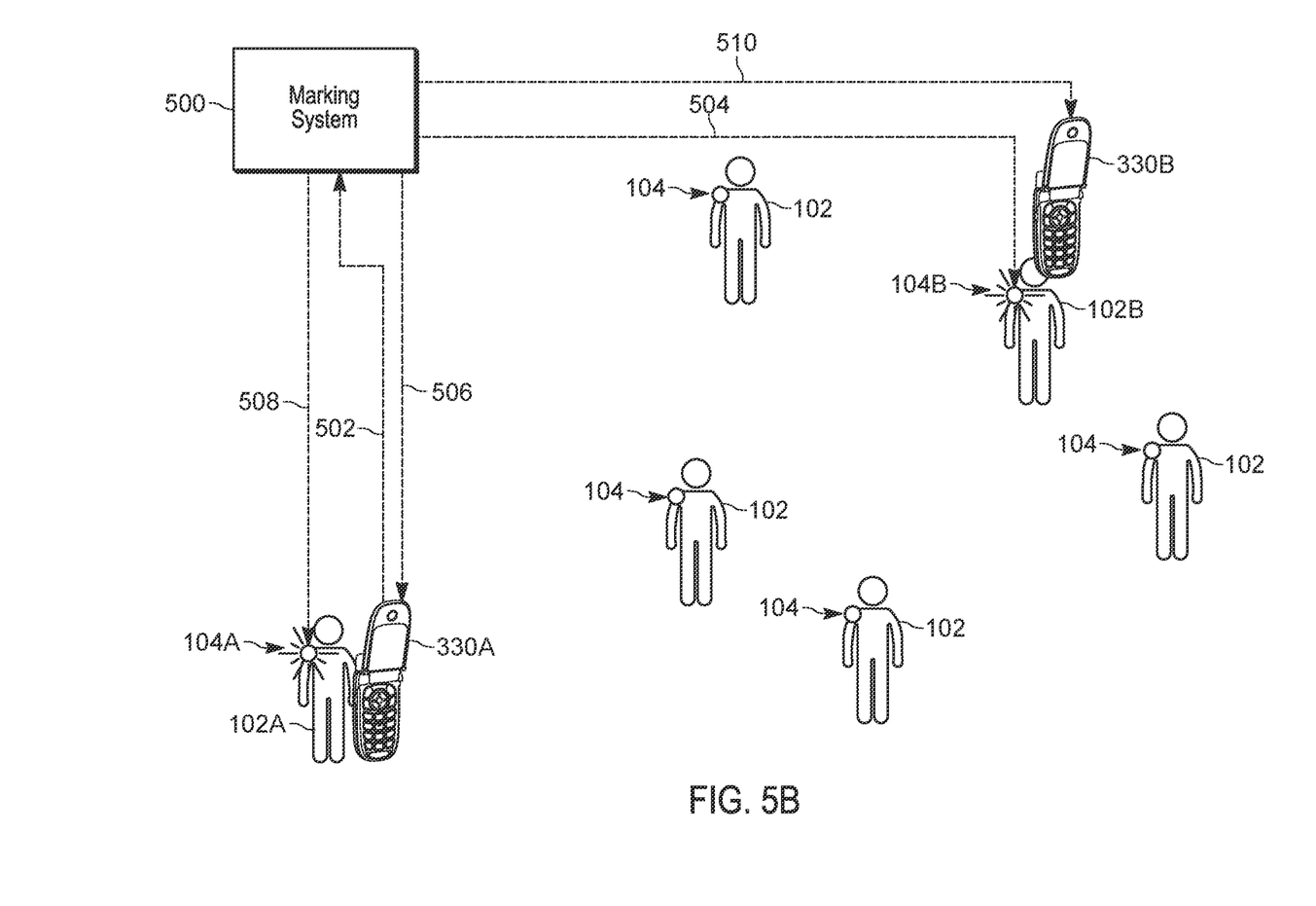
FIG. 5B is a schematic diagram of an example incident in which a first mobile physical entity requests a resource, and the first mobile physical entity and the second mobile physical entity are marked accordingly.

FIG. 5B shows an example similar to FIG. 5A and only differences will be described in detail.

Continuing the example of FIG. 5A, the marking system 500 may also transmit a marking signal 508 to the marking device 104A carried by the first responder 102A that was the source of the request 502. The marking device 104A may then illuminate which may help the commander 102B locate and instruct the newly arrived first responder 102A. The marking signals 504, 508 may be encoded to cause the marking devices 104B, 104A to illuminate in the same way (e.g., same color and modulation). This may provide a further queue to the first responders 102A, 102B. At the same time, the system 500 may transmit an advisory message 510 to the commander 102B, such as "A paramedic marked with red light is looking for you."

In further examples with reference to FIGS. 5A and 5B, the resource needed and provided may include medical equipment (e.g., a defibrillator), medical/first-aid supplies (e.g., morphine, bandages, etc.), a skill (e.g., CPR, training in usage of a defibrillator, etc.), knowledge of the incident, and so on.

Figure 6:
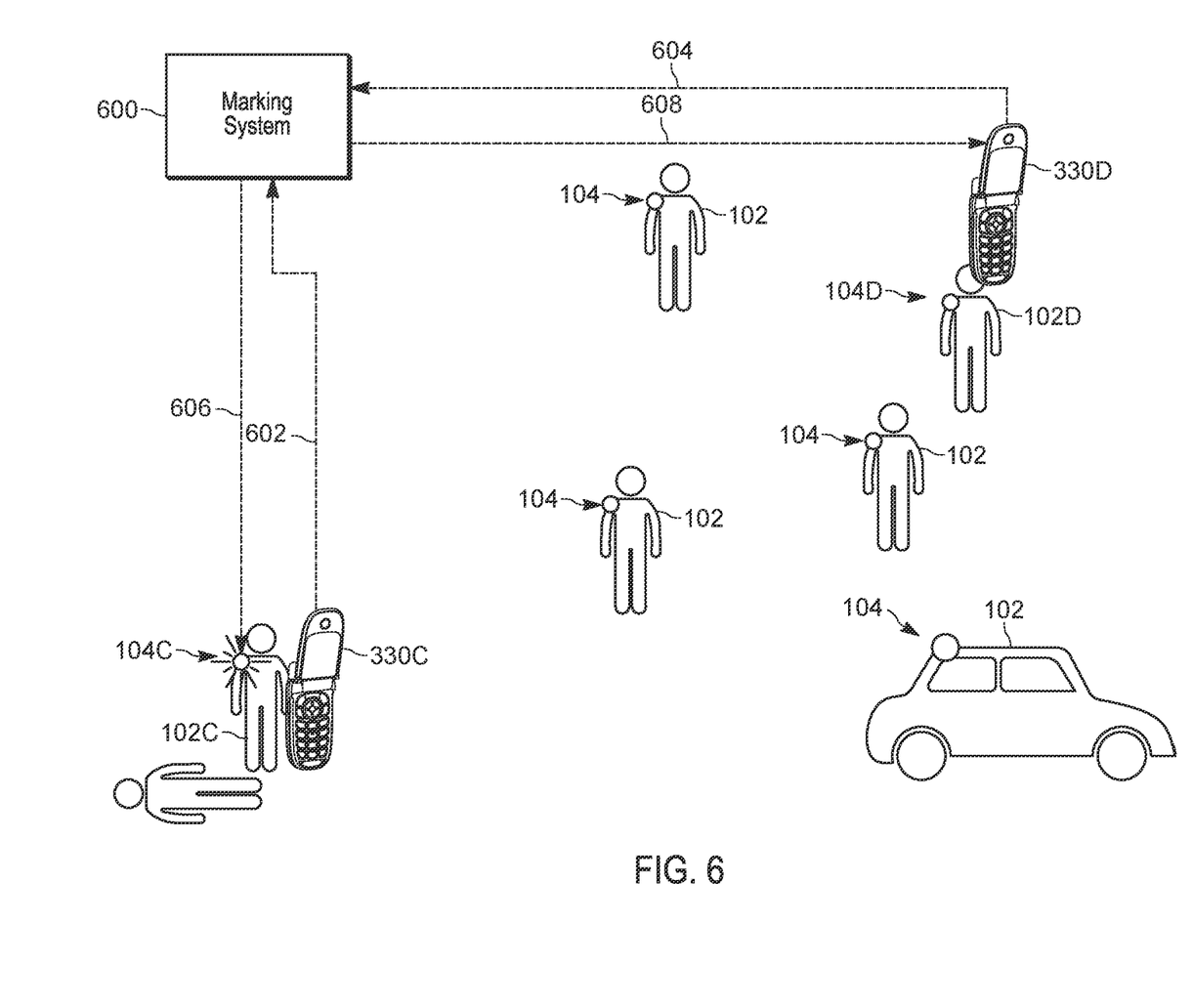
FIG. 6 is a schematic diagram of an example incident in which a first mobile physical entity asserts the ability to provide a resource and a second mobile physical entity is marked accordingly.

FIG. 6 shows an example incident managed by a visual marking system 600. The marking system 600 may implement any of the systems and methods discussed above.

In this example, a first responder 102C speaks a request for a required resource into their mobile communications device 330C. For example, the first responder 102C may be a paramedic tending to a wounded person and may make a request 602 for a resource, such as "I need morphine."

The marking system 600 may track this request until another first responder 102D asserts that they have the requested resource. For example, the first responder 102D may say "I have morphine" which is captured by their mobile communications device 330D and transmitted to the marking system 600 as a request 604 to provide the resource.

The marking system 600 may match the request 602 indicating need and the request 604 indicating ability and transmit a marking signal 606 to a marking device 104C carried by the first responder 102C in need and transmit an instruction message 608 to the mobile communications device 330D of the first responder able to fill that need. The target marking device 104C may illuminate (e.g., in blue) and the mobile communications device 330D may output a message such as "The person who needs morphine is shown with blue light."

Figure 7:
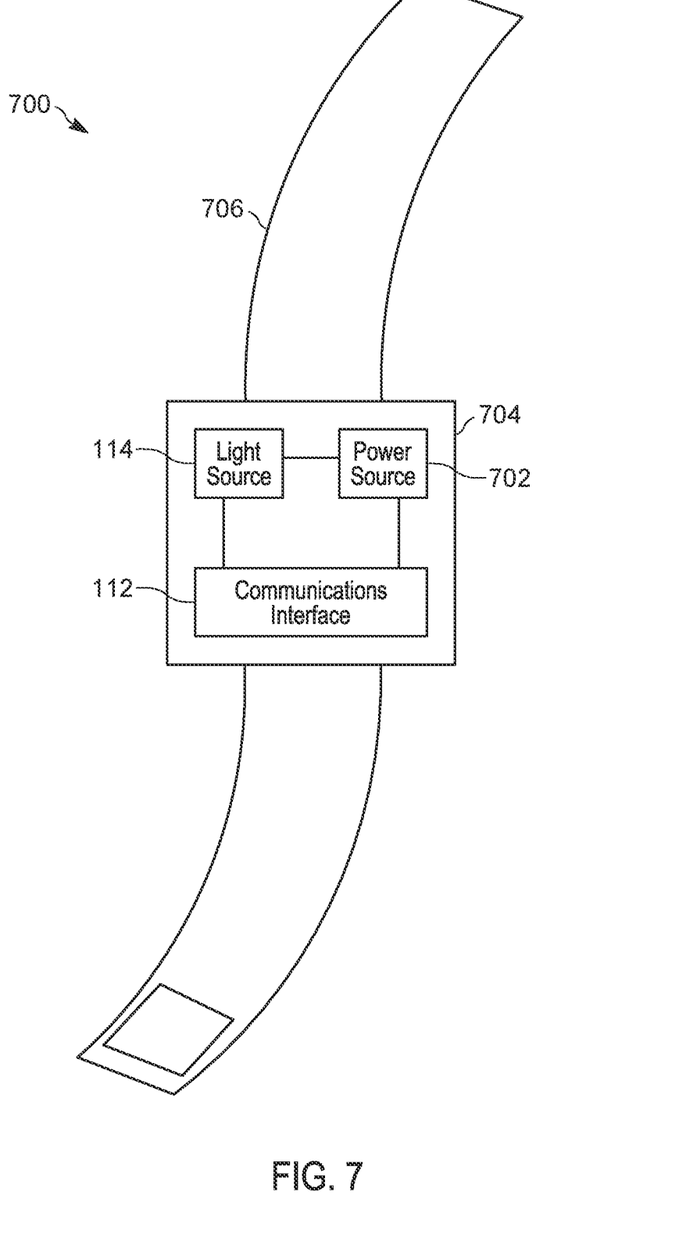
FIG. 7 is a block diagram of an example marking device.

FIG. 7 shows an example marking device 700 that may be used as any of the marking devices discussed herein, such as marking devices 104.

The marking device 700 includes a light source 114 and connected communications interface 112, as discussed above. The marking device 700 further includes a power source 702 (e.g., a battery) connected to the light source 114 and the communications interface 112 to power these components.

The marking device 700 further includes a housing 704 to contain the components 112, 114, 702, and an attachment component 706 connected to the housing 704 to attach the marking device 700 to a mobile physical entity. In this example, the attachment component 706 is a wrist strap. Other examples of attachment components are given above.

In view of the above, it should be apparent that mobile entities, such as people, vehicles, and mobile equipment, may be visually marked to assist in efficient communication among a group of people, vehicles, and mobile equipment. Marking may be automatic in response to a request that concerns a provided or needed resource. This may allow for greater efficiency in responding to emergency incidents and rendering aid, which benefits everyone involved in such incidents.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot illuminate marking devices, among other features and functions set forth herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising." "has", "having." "includes", "including." "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a". "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a server including:
  a server communications interface configured to receive a request and transmit a marking signal via a network; and
  a processor connected to the server communications interface, the processor configured to:
    perform an analysis on the request to match the request to a mobile physical entity of a plurality of mobile physical entities;
    select from a plurality of marking devices that are deployable to the plurality of mobile physical entities a target marking device that is associated with the mobile physical entity that matches the request;
    transmit the marking signal to the target marking device via the server communications interface to cause a light source of the target marking device to illuminate and thereby mark the mobile physical entity that matches the request;
    maintain a history of an incident attended by the plurality of mobile physical entities based on signals captured from a plurality of mobile communications devices deployed to the plurality of mobile physical entities; and
    perform the analysis with reference to the history of the incident.

2. The system of claim 1, further comprising:
the plurality of marking devices, each of the plurality of marking devices including:
  a marker communications interface configured to receive the marking signal via the network; and
  a respective light source connected to the marker communications interface and configured to illuminate in response to the marking signal.

3. The system of claim 1, wherein the analysis includes:
identifying a resource from the request; and
matching the request to the mobile physical entity based on the plurality of mobile physical entities providing or needing the resource.

4. The system of claim 3, wherein:
the request is provided by voice or text captured by a mobile communications device; and
the analysis includes identifying the resource from the voice or text.

5. The system of claim 3, wherein:
the plurality of mobile physical entities includes first responders; and
the analysis includes comparing the resource of the request to resources provided or needed by the first responders including one or more of: a role of a first responder, a skill of a first responder, a piece of equipment carried by a first responder, a first-aid supply carried by a first responder, a vehicle operated by a first responder, and incident information associated with a first responder.

6. The system of claim 3, wherein:
the plurality of mobile physical entities includes vehicles; and
the analysis includes comparing the resource of the request to resources provided by the vehicles including one or more of: a piece of equipment carried by a vehicle, a first-aid supply carried by a vehicle, and incident information associated with a vehicle.

7. The system of claim 1, wherein the analysis includes selecting the mobile physical entity based on a comparison of a location of a source of the request and locations of the plurality of mobile physical entities.

8. The system of claim 1, wherein the processor is further configured to:
associate the plurality of mobile physical entities to information concerning an incident attended by the plurality of mobile physical entities based on signals captured from a plurality of mobile communications devices deployed to the plurality of mobile physical entities; and
perform the analysis with reference to the information to select the mobile physical entity in response to the request indicating a request for a mobile physical entity that has information about the incident.

9. The system of claim 1, wherein the processor is further configured to:
select from the plurality of marking devices a requesting marking device that is associated with a source of the request; and transmit the marking signal to the requesting marking device via the server communications interface to cause the light source of the requesting marking device to illuminate and thereby mark the source of the request.

10. The system of claim 1, wherein:
the light source of each of the plurality of marking devices is configured to emit light of different colors; and
the processor is further configured to encode a selected color in the marking signal to cause the light source of the target marking device to illuminate at the selected color.

11. The system of claim 1, wherein a marking device of the plurality of marking devices includes an attachment component configured to attach the marking device to a person, clothing, or a vehicle.

12. The system of claim 11, wherein the attachment component includes a wristband.

13. The system of claim 1, wherein a marking device of the plurality of marking devices is part of a mobile communications device or a body-worn camera.

14. A non-transitory computer-readable medium comprising instructions that, when executed by a processor, cause the processor to:
perform an analysis on a request to match the request to a mobile physical entity of a plurality of mobile physical entities deployed with a plurality of marking devices, wherein the analysis compares a resource determined from the request with resources provided or needed by the plurality of mobile physical entities to determine the match, wherein each marking device of the plurality of marking devices is configured to selectively illuminate, wherein the analysis includes matching the request to the mobile physical entity based on the plurality of mobile physical entities providing or needing the resource;
select from the plurality of marking devices a target marking device that is associated with the mobile physical entity that matches the request;
control a communications interface to transmit a marking signal to the target marking device to cause the target marking device to illuminate and thereby mark the mobile physical entity that matches the request;
associate the plurality of mobile physical entities to information concerning an incident attended by the plurality of mobile physical entities based on signals captured from a plurality of mobile communications devices deployed to the plurality of mobile physical entities; and
perform the analysis with reference to the information to select the mobile physical entity in response to the request indicating a request for a mobile physical entity that has information about the incident.

15. The non-transitory computer-readable medium of claim 14, wherein the analysis includes selecting the mobile physical entity based on a comparison of a location of a source of the request and locations of the plurality of mobile physical entities.

16. The non-transitory computer-readable medium of claim 14, wherein the instructions are further to:
maintain a history of an incident attended by the plurality of mobile physical entities based on signals captured from a plurality of mobile communications devices deployed to the plurality of mobile physical entities; and
perform the analysis with reference to the history of the incident.

17. The non-transitory computer-readable medium of claim 14, wherein the instructions are further to:
select from the plurality of marking devices a requesting marking device that is associated with a source of the request; and
control the communications interface to transmit the marking signal to the requesting marking device to cause the requesting marking device to illuminate and thereby mark the source of the request.

18. A method comprising:
performing an analysis on a request to match the request to a mobile physical entity of a plurality of mobile physical entities deployed with a plurality of marking devices, wherein the analysis compares a resource determined from the request with resources provided or needed by the plurality of mobile physical entities to determine the match, wherein each marking device of the plurality of marking devices is configured to selectively illuminate, wherein the analysis includes matching the request to the mobile physical entity based on the plurality of mobile physical entities providing or needing the resource;
selecting from the plurality of marking devices a target marking device that is associated with the mobile physical entity that matches the request;
transmitting a marking signal to the target marking device to cause the target marking device to illuminate and thereby mark the mobile physical entity that matches the request;
maintaining a history of an incident attended by the plurality of mobile physical entities based on signals captured from a plurality of mobile communications devices deployed to the plurality of mobile physical entities; and
performing the analysis with reference to the history of the incident.

* * * * *